United States Patent
Gill et al.

(10) Patent No.: US 8,375,177 B2
(45) Date of Patent: Feb. 12, 2013

(54) APPARATUS, SYSTEM, AND METHOD FOR EFFICIENTLY VERIFYING WRITES

(75) Inventors: Binny Sher Gill, Auburn, MA (US); Jeremy Michael Pinson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 11/743,033

(22) Filed: May 1, 2007

(65) Prior Publication Data

US 2008/0276047 A1 Nov. 6, 2008

(51) Int. Cl.
G06F 12/00 (2006.01)
(52) U.S. Cl. ............ 711/154; 711/161; 714/42
(58) Field of Classification Search .......... 711/161, 711/42, 154; 714/42, 8, 824, 807
See application file for complete search history.

(56) References Cited

U.S. PATENT DOCUMENTS

| | | | | |
|---|---|---|---|---|
| 5,499,337 | A | 3/1996 | Gordon | 395/182.04 |
| 5,555,249 | A * | 9/1996 | Hilley et al. | 714/718 |
| 5,699,508 | A * | 12/1997 | Khashayar | 714/42 |
| 5,822,513 | A * | 10/1998 | Ofer et al. | 714/42 |
| 6,237,052 | B1 | 5/2001 | Stolowitz | 710/61 |
| 6,408,406 | B1 * | 6/2002 | Parris | 714/41 |
| 6,412,042 | B1 * | 6/2002 | Paterson et al. | 711/112 |
| 6,854,022 | B1 * | 2/2005 | Thelin | 710/5 |
| 6,970,890 | B1 | 11/2005 | Bruce et al. | 707/202 |
| 7,028,147 | B2 | 4/2006 | Wu et al. | 711/150 |
| 7,143,305 | B2 | 11/2006 | Hajji et al. | |
| 7,360,112 | B2 | 4/2008 | Durica et al. | |
| 7,421,535 | B2 | 9/2008 | Jarvis et al. | |
| 7,454,686 | B2 | 11/2008 | Broadbent et al. | |
| 7,594,134 | B1 * | 9/2009 | Coatney et al. | 714/3 |
| 7,603,528 | B2 * | 10/2009 | Cochran et al. | 711/162 |
| 2003/0065983 | A1 * | 4/2003 | Miller et al. | 714/42 |
| 2003/0131191 | A1 * | 7/2003 | Zhang et al. | 711/113 |
| 2003/0226063 | A1 * | 12/2003 | Bridge et al. | 714/42 |
| 2004/0193812 | A1 | 9/2004 | Zayas et al. | 711/154 |
| 2005/0132133 | A1 * | 6/2005 | Keohane et al. | 711/112 |
| 2006/0010227 | A1 | 1/2006 | Atluri | 709/217 |
| 2006/0090112 | A1 | 4/2006 | Cochran et al. | 714/737 |
| 2006/0294299 | A1 * | 12/2006 | Edirisooriya | 711/112 |
| 2007/0186047 | A1 | 8/2007 | Jarvis et al. | |
| 2008/0091893 | A1 | 4/2008 | Durica et al. | |
| 2008/0250200 | A1 | 10/2008 | Jarvis et al. | |
| 2009/0006904 | A1 | 1/2009 | Broadbent et al. | |

OTHER PUBLICATIONS

Gibson Research Corporation, http://www.grc.com/sranalysis.htm.*

* cited by examiner

*Primary Examiner* — Matthew Bradley
(74) *Attorney, Agent, or Firm* — Kunzler Law Group, PC

(57) ABSTRACT

An apparatus, system, and method are disclosed for efficiently verifying writes. A storage module stores a plurality of data sets in a storage controller memory. A write module writes the plurality of data sets through a first write channel to a hard disk drive. A verification module verifies whether a representative data set of the plurality of data sets is successfully written to the first write channel or not. A mitigation module rewrites the plurality of data sets in response to an unsuccessful write of the representative data set.

15 Claims, 6 Drawing Sheets

APPARATUS, SYSTEM, AND METHOD FOR EFFICIENTLY VERIFYING WRITES

BACKGROUND OF THE INVENTION

1. Field of the Invention

This invention relates to verifying writes and more particularly relates to efficiently verifying writes.

2. Description of the Related Art

Hard disk drives are often used as non-volatile storage devices. As the capacity of hard disk drives have doubled about every nine months for many years, hard disk drives now have the capability of storing large amounts of data at low per byte costs.

A storage controller typically receives data that is to be stored to a hard disk from a computer through an internal cable or over a network from a host. The storage controller may be integrated within the hard disk drive or be external to the hard disk drive and communicate with the hard disk drive through a cable. The hard disk drive often includes one or more platters or hard disks. Data may be written to and read from each hard disk with a head.

The storage controller is often configured to report to the computer and/or host that the data is successfully written to the hard disk drive after receiving the data. Subsequent to receiving the report that the data is successfully written, the computer and/or host may overwrite the data in volatile memory. The storage controller may temporarily store the data and assure that the data is written to the hard disk drive.

A hard disk drive may occasionally have an error called a dropped write. In a dropped write, data is not correctly written to a hard disk. However, the hard disk drive reports to the computer and/or host that the data is correctly written. A dropped write can result in data corruption that is not detected for an extended period.

Hard disk drives can perform a write-with-verify operation to assure that data is correctly written to a hard disk. In the write-with-verify operation, the hard disk writes the data, then reads the written data and verifies that the data is written correctly. If the data is written incorrectly, the hard disk drive may rewrite the data. Unfortunately, performing a write-with-verify operation for each write significantly increases the time required for writes, slowing the performance of the hard disk drive.

SUMMARY OF THE INVENTION

From the foregoing discussion, there is a need for an apparatus, system, and method that efficiently verify writes. Beneficially, such an apparatus, system, and method would efficiently verify that writes are correctly written or not. Additionally, such an apparatus, system, and method would correctly write data and significantly decrease the time required for verifying writes.

The present invention has been developed in response to the present state of the art, and in particular, in response to the problems and needs in the art that have not yet been fully solved by currently available hard disk drives. Accordingly, the present invention has been developed to provide an apparatus, system, and method for efficiently verifying writes that overcome many or all of the above-discussed shortcomings in the art.

The apparatus to efficiently verify writes is provided with a plurality of modules configured to functionally execute the steps of storing a plurality of data sets, writing the plurality of data sets to a first write channel, verifying that a representative data set is successfully written to the first write channel, and rewriting the plurality of data sets in response to an unsuccessful write. The apparatus may further execute the step of randomly selecting data blocks constituting a representative data set. These modules in the described embodiments include a storage module, a write module, a verification module, a storage controller, a storage controller memory, and a mitigation module. The apparatus may further include a selection module.

The storage module stores the plurality of data sets in a storage controller memory. The write module writes the plurality of data sets through a first write channel to a hard disk drive. The verification module verifies that a representative data set of the plurality of data sets is successfully written to the first write channel. The representative data set may be a last data set of the plurality of data sets written through the first write channel. The write module may write the representative data set using a write-with-verify write. The verification module may verify the representative data set is successfully written if the write-with-verify write is successful. In response to an unsuccessful write of the representative data set, the mitigation module rewrites the plurality of data sets.

Alternatively, the representative data set may be a specified value. The write module may further write the representative data set to a specified first data blocks. The verification module may further verify the representative data by reading data from the specified first data blocks and comparing the read data with the specified value. In response to an unsuccessful write of the representative data set, the mitigation module rewrites the plurality of data sets.

Further, in an embodiment, the selection module randomly selects data blocks accessed through the first write channel and stores original data from the selected data blocks to the storage controller memory. The write module may further write the representative data set to the selected data blocks. The verification module may further verify that the representative data is successfully written to selected data blocks. The selection module may restore the original data to the selected data blocks. The apparatus efficiently verifies writes of the plurality of data sets through the first write channel by verifying the representative data.

A system of the present invention is also presented for efficiently verifying writes. The system may be embodied in a hard disk drive. In particular, the system, in one embodiment, includes at least one hard disk drive comprising a plurality of write channels and a storage controller. The storage controller includes a storage module, a write module, a verification module, and a mitigation module. The storage controller may further include a selection module.

The hard disk drive comprises one or more write channels. The storage controller accesses the hard disk drive. The storage module stores a plurality of data sets in a storage controller memory. The write module writes the plurality of data sets through a first write channel to the hard disk drive. The verification module verifies that a representative data set of the plurality of data sets is successfully written to the first write channel or not. The mitigation module rewrites the plurality of data sets in response to an unsuccessful write of the representative data set.

Further, in an embodiment, the representative data set is a specified value. The write module may further write the representative data set to the specified first data blocks. The verification module may further verify the representative data by reading data from the specified first data blocks and comparing the read data with the specified value.

A method of the present invention is also presented for efficiently verifying writes. The method in the disclosed embodiments substantially includes the steps to carry out the functions presented above with respect to the operation of the described apparatus and system. In one embodiment, the method includes storing a plurality of data sets, writing the plurality of data sets, verifying that representative data set, and rewriting the plurality of data sets. The method also includes randomly selecting data blocks.

The storage module stores a plurality of data sets in a storage controller memory. The write module writes the plurality of data sets through a first write channel to a hard disk drive. The verification module verifies that a representative data set of the plurality of data sets is successfully written to the first write channel or not. The mitigation module rewrites the plurality of data sets in response to an unsuccessful write of the representative data set.

The representative data set may be the last data set of the plurality of data sets written through the first write channel. The write module may write the representative data set using a write-with-verify write. The verification module may verify the representative data set is successfully written if the write-with-verify write is successful. In response to an unsuccessful write of the representative data set, the mitigation module rewrites the plurality of data sets.

Alternatively, the representative data set may be a specified value. The write module may further write the representative data set to the specified first data blocks. The verification module may further verify the representative data by reading data from the specified first data blocks and comparing the read data with the specified value. In response to an unsuccessful write of the representative data set, the mitigation module rewrites the plurality of data sets.

Further, in an embodiment, the selection module randomly selects data blocks accessed through the first write channel and stores original data from the selected data blocks to the storage controller memory. The write module may further write the representative data set to the selected data blocks. The verification module may further verify that the representative data is successfully written to the selected data blocks. The selection module may restore the original data to the selected data blocks.

References throughout this specification to features, advantages, or similar language do not imply that all of the features and advantages that may be realized with the present invention should be realized in any single embodiment of the invention. Rather, language referring to the features and advantages is understood to mean that a specific feature, advantage, or are characteristics described in connection with an embodiment is included in the at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an apparatus, system, and method for efficiently verifying writes. Beneficially, such an apparatus, system, and method would efficiently verify that writes are correctly written or not. Additionally, such an apparatus, a system, and a method would correctly write data and significantly decrease the time required for verifying writes. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays (FPGA), programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
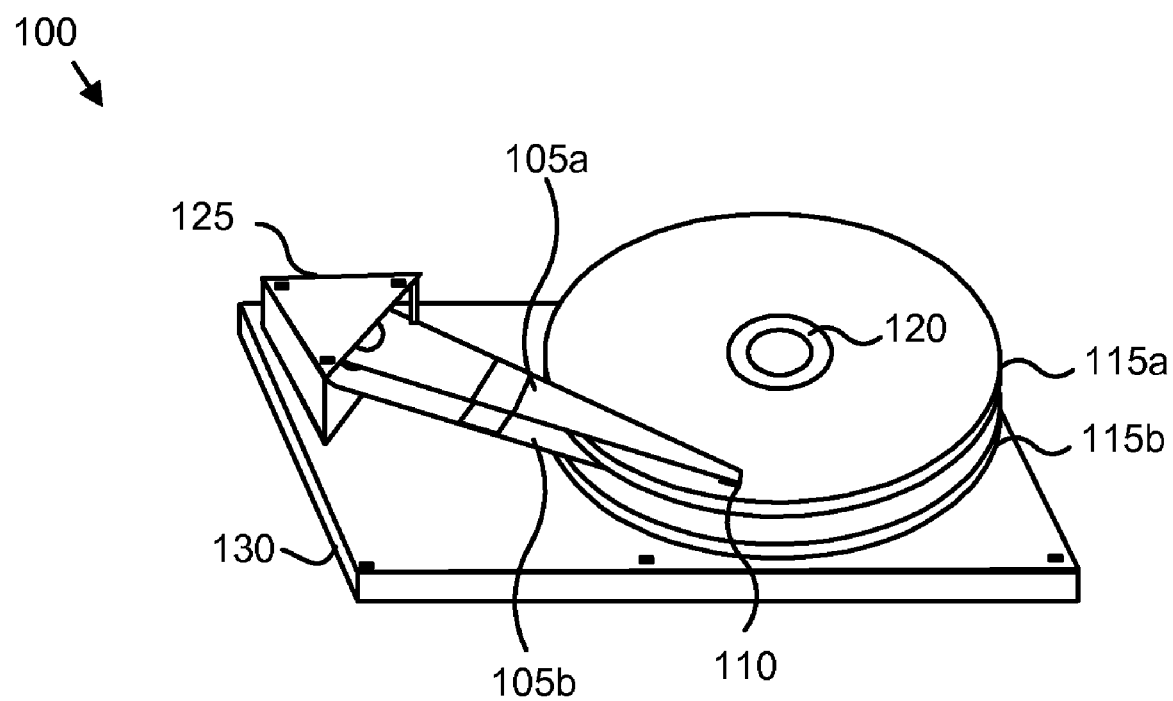
FIG. 1 is a perspective drawing illustrating one embodiment of a hard disk drive in accordance with the present invention.

FIG. 1 is a perspective drawing illustrating one embodiment of a hard disk drive 100 in accordance with the present invention. The hard disk drive 100 includes a plurality of write channels. Each write channel may include a read-write head 110 mounted on a corresponding actuator arm 105 and at least one flat circular disk called a platter or hard disk 115. The plurality of hard disks 115 may be connected to a spindle 120 resting on a platform 130 and may be rotated by a motor (not shown) or the like at very high speeds. An actuator 125 may hinge the plurality of actuator arms 105. Although for simplicity, the hard disk drive 100 is shown with two (2) actuator arms 105a, 105b each with a read-write head 110, and two (2) hard disks 115a, 115b, any number of actuator arms 105, read-write heads 110, and hard disks 115 can be used in the drive 100.

The hard disk 115 of the drive 100 may be primarily made from a non-magnetic material such as glass or aluminum and coated with a thin layer of magnetic materials such as Cobalt-based alloy or Iron (III) oxide. The plurality of hard disks 115 may store analog data by frequency modulation method or by any other similar method. The method used may convert the data into a form of binary digits.

The actuator arm 105 moves the read-write head 110 in a substantially radial fashion across each hard disk 115, as the hard disks 115 spin, allowing the read-write head 110 to access almost the entire surface of the hard disk 115. The read-write head 110 in close proximity of the hard disk 115 may write the data by magnetizing the magnetic material of the platter 115. One (1) read-write head 110 may be used for each hard disk 115. The read-write head 110 of the hard disk drive 100 may be of the Metal in Gap (MIG) type, Thin Film (TF) type, or the like.

The hard disk drive 100 may use a plurality of write channels, each comprising an actuator arm 105, a read-write head 110 and a hard disk 115. During an operation of writing the data, any one of the write channels may be out of order and hence may cause a dropped write error. The data may not be correctly written to the hard disk drive 100. However, the hard disk drive 100 may report to the computer and/or host that the data is correctly written. The present invention efficiently verifies writes to detect dropped writes.

Figure 2:
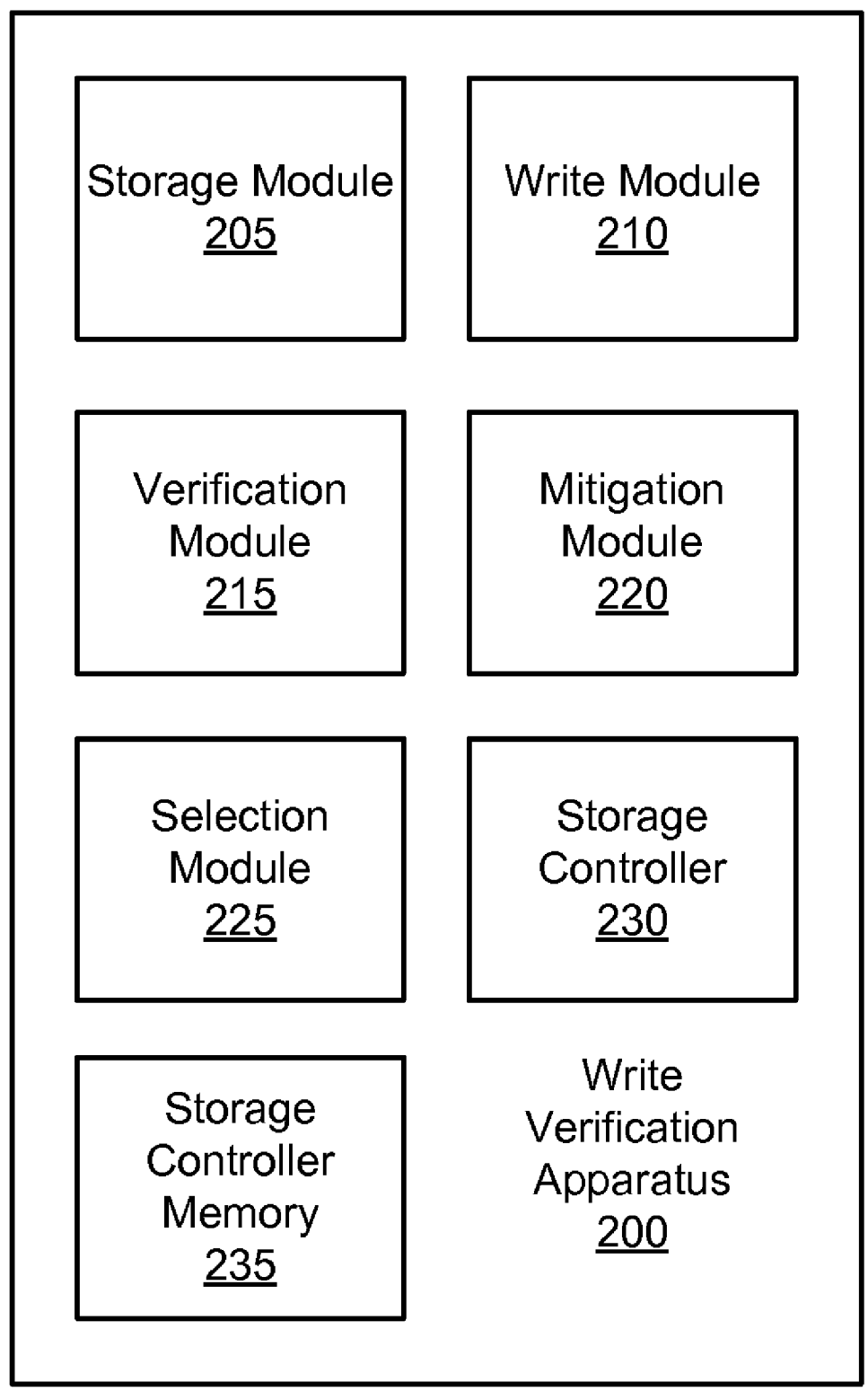
FIG. 2 is a schematic block diagram illustrating one embodiment of a write verification apparatus of the present invention.

FIG. 2 is a schematic block diagram illustrating one embodiment of a write verification apparatus 200 of the present invention. The apparatus 200 efficiently verifies writes and can be embodied in a hard disk drive 100 of FIG. 1. The description of apparatus 200 refers to elements of FIG. 1, like numbers referring to like elements. The apparatus 200 includes a storage module 205, a write module 210, a verification module 215, a mitigation module 220, a storage controller 230, and a storage controller memory 235. The apparatus may further include a selection module 225.

The storage controller 230 may reside within the hard disk drive 100. Alternatively, the storage controller 230 may be distinct from the drive 100. The storage module 205 stores a plurality of data sets in a storage controller memory 235. For example, the storage module 205 may store ten (10) data sets in the storage controller memory 235. The storage controller memory 235 may be a non-volatile memory such as a hard disk memory and/or a Flash random access memory (RAM), or a volatile memory such as dynamic random access memory (DRAM) or the like that is used by the storage controller 230 to temporarily store data sets before the data sets are written to hard disks 115. The storage module 205 may be embodied in the storage controller 230.

The write module 210 writes the plurality of data sets through a first write channel to the hard disk drive 100. For example, the write module 210 may write the ten (10) data sets through the first write channel to the hard disk drive 100. The write module 210 may be embodied in the storage controller 230.

The verification module 215 verifies that a representative data set of the plurality of data sets is successfully written to a write channel. The representative data set may be the last data set of the plurality of data sets written through the first write channel. For example, the verification module 215 may automatically verify that the tenth ($10^{th}$) data set of the ten (10) data sets is successfully written to the first write channel. The verification module 215 may be embodied in the storage controller 230.

The selection module 225 may randomly select data blocks accessed through the first write channel and store original data from the selected data blocks to the storage controller memory 235. In an embodiment, the selected data blocks store data that can be automatically regenerated as and when required. Additionally the selection module 225 may restore the original data to the selected data blocks. The selection module 225 may be embodied in the storage controller 230.

The mitigation module 220 rewrites the plurality of data sets in response to an unsuccessful write of the representative data set. For example, in response to an unsuccessful write of the representative tenth ($10^{th}$) data set, the mitigation module 220 may automatically rewrite the ten (10) data sets using the same or another write channel. The mitigation module 220 may be embodied in the storage controller 230.

The schematic flow chart diagram that follows are generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and the symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
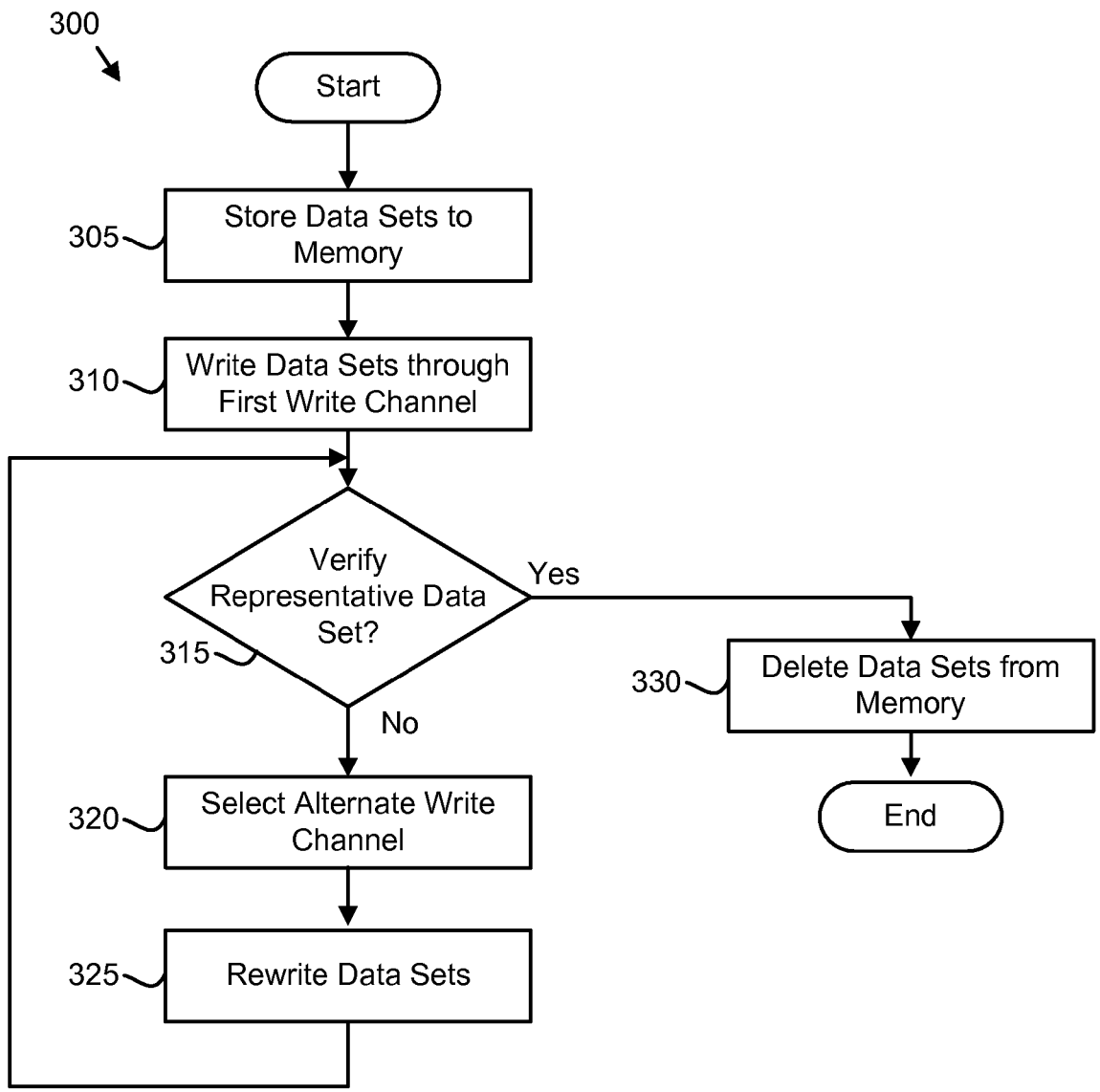
FIG. 3 is a schematic flow chart diagram illustrating one embodiment of a write verification method of the present invention.

FIG. 3 is a schematic flow chart diagram illustrating one embodiment of a write verification method 300 of the present invention. The method 300 substantially includes the steps to carry out the functions presented above with respect to the operation of the described apparatus 200 and system 100 of FIGS. 2 and 1 respectively. The description of method 300 refers to elements of FIGS. 1-2, like numbers referring to the like elements. In one embodiment, the method is implemented with a computer program product comprising a computer readable medium having a computer readable program. The storage controller 230 executes the computer readable program.

The method 300 starts and in an embodiment, the storage module 205 stores 305 a plurality of data sets in a storage controller memory 235. For example, the storage module 205 may store 305 one hundred (100) data sets sequentially in the storage controller memory 235. The storage controller memory 235 may be a non-volatile memory such as a static random access memory (SRAM), a flash memory, a magnetic computer storage device like the hard disk 115 of the hard disk drive 100, a magnetic tape, an optical disk drive, or the like.

The write module 210 writes 310 the plurality of data sets through a first write channel to the hard disk drive 100. For example, the write module 210 may write 310 the one hundred (100) data sets through the first write channel to the hard disk drive 100.

In one embodiment, the write module 210 writes 310 a representative data set through the first write channel. The representative data set may be the last data set of the plurality of data sets.

Alternatively, the representative data set may be a specified value. For example, the representative data set may be the specified hexadecimal value 'ED72A430x'. In an embodiment, the write module 210 writes 310 the representative data set to the specified first data blocks. There may be a plurality of first data blocks. For example, there may be two (2) data blocks of the first write channel.

The write module 210 may write 310 the specified value 'ED72A430x' to two (2) first data blocks such that the specified value is written to every word of the two (2) first data blocks. The write module 210 may write 310 the representative data set to the specified first data blocks using a write-with-verify write.

Additionally, in response to a policy, the selection module 225 may select specified second data blocks in place of the specified first data blocks. The policy may be an elapse of a specified time interval. For example, if there is an elapse of twenty seconds (20 secs) or more of writing data to the specified first data blocks, the selection module 225 may select specified second data blocks. There may be plurality of second data blocks.

Alternatively, the policy may be a processing of a specified number of writes to the write channel. For example, if there are ten thousand (10,000) writes to the first data blocks, the selection module 225 may select 320 one or more second data blocks to receive the representative data set.

In another embodiment of the method 300, the selection module 225 randomly selects the data blocks for writing the representative data set. The selected data blocks may store data that can be regenerated. In an embodiment, the selection module 225 may randomly select unused data blocks of the write channel. For example, the selection module 225 randomly selects three (3) unused data blocks accessed through the first write channel. The storage module 205 may store 305 original data from the selected data blocks to the storage controller memory 235. The write module 210 may write 310 the representative data set to the selected data blocks.

Whenever the selection module 225 selects the first or second data blocks that constitute the representative data sets, the selection module 225 may read the original data from the hard disks 115 and store the data in the storage controller memory 235. Further, whenever the selection module 225 selects a new set of data blocks constituting the representative data sets, the selection module 225 may restore the data of the first data blocks from the storage controller memory 235 to the hard disks 115.

The verification module 215 verifies 315, if the representative data set of the plurality of data sets is successfully written to the first write channel. The representative data set may be the last data set of the plurality of data sets written through the first write channel. For example, the representative data set may be the one hundredth ($100^{th}$) data set of the one hundred (100) data sets written through the first write channel.

In an embodiment, the write module 210 writes 310 the representative data set using a write-with-verify write. The representative data set may be successfully written if the write-with-verify write is successful. In the write-with-verify write, the write module 210 writes 310 the representative data set, reads the written representative data set, and then the verification module 215 verifies 315 that the data is successfully written or not. For example, the write module 210 may write 310 the one hundredth ($100^{th}$) data set of the one hundred (100) data sets, may read the one hundredth ($100^{th}$) data set, and then the verification module 215 may verify 315 that the one hundredth ($100^{th}$) data set of the one hundred (100) data sets is successfully written.

The verification module 215 may verify 315 the representative data set by reading data from the specified first data blocks and comparing the read data with the specified value. In an alternate example, the verification module 215 may read data from the two (2) first data blocks and further may verify 315 that each word from the two (2) first data blocks is equal to the specified value of 'ED72A430x'. If the value of the read data from the specified first data blocks is equal to the specified value, the verification module 215 may verify 315 that the representative data set in the form of the specified value of the plurality of data sets is successfully written to the first write channel.

If the value of the read data from the specified first data block is not equal to the specified value, the verification module 215 may determine that the representative data set in the form of the specified value of the plurality of data sets is not successfully written to the first write channel. For example, if the read data contains words different from 'ED72A430x', the verification module 215 may determine that the representative data set of the plurality of data sets is not successfully written to the first write channel.

If the verification module 215 verifies 315 that the representative data set of the plurality of data sets is successfully written to the first write channel, the storage module 205 may delete 330 the stored data sets from the storage controller memory 235. For example, if the verification module 215 verifies 315 that the one hundredth ($100^{th}$) data set of the one hundred (100) data sets is successfully written to the first write channel, the storage module 205 may delete the one hundred (100) stored data sets from the storage controller memory 235.

If the verification module 215 determines that the representative data set of the plurality of data sets is not successfully written to the first write channel, the write module 210 may select 320 an alternate write channel to write 310 the plurality of data sets. For example, the write module 210 may select 320 a second write channel comprising a second read-write head 110 and a second hard disk 115.

In response to an unsuccessful write of the representative data set, the mitigation module 220 rewrites 325 the plurality of data sets. In an embodiment, the mitigation module 220 may rewrite 325 the plurality of data sets through the second write channel. In another embodiment, the mitigation module 220 may rewrite 325 the plurality of data sets through the first write channel.

Further, the method 300 may loop to verify a plurality of write channels by verifying the representative data set for each write channel. For example, the method 300 may loop two (2) times to verify two (2) write channels of the hard disk drive 100. Each representative data set for each write channel may be unique. For example, the representative data for the first write channel may be the one hundredth ($100^{th}$) data set of the one hundred (100) data sets and the representative data for the second channel may be the specified value of 'ED72A430x'.

By verifying 315 that the representative data set is written, the method 300 verifies the first write channel without verifying each data set written through the data channel. Thus the present invention may detect and mitigate dropped writes without the costly overhead of verifying each data set written through the first write channel.

Figure 4:
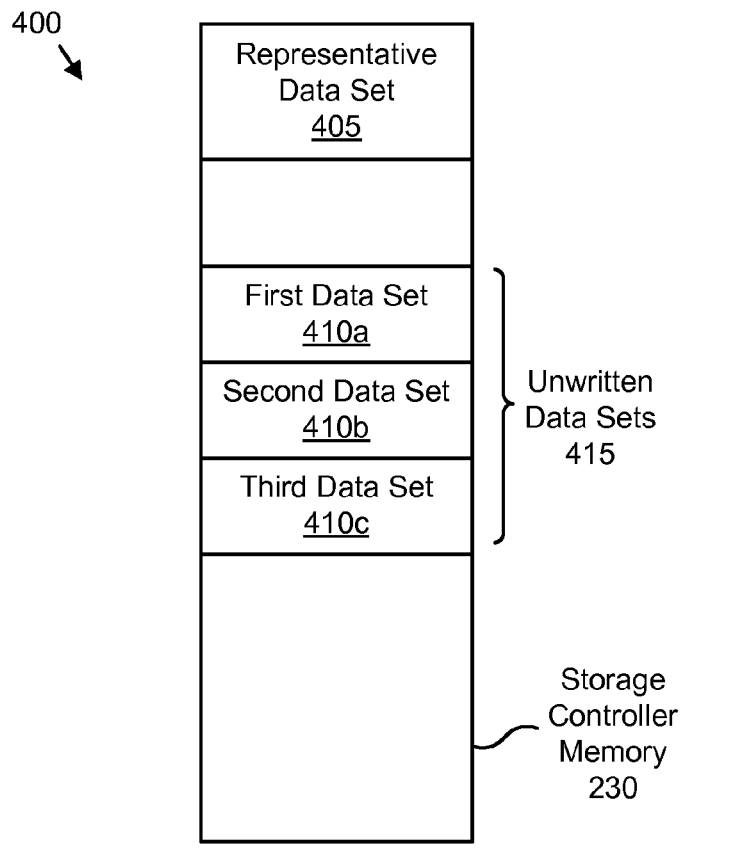
FIG. 4 is a schematic block diagram illustrating one embodiment of unwritten data of the present invention.
Figure 4:
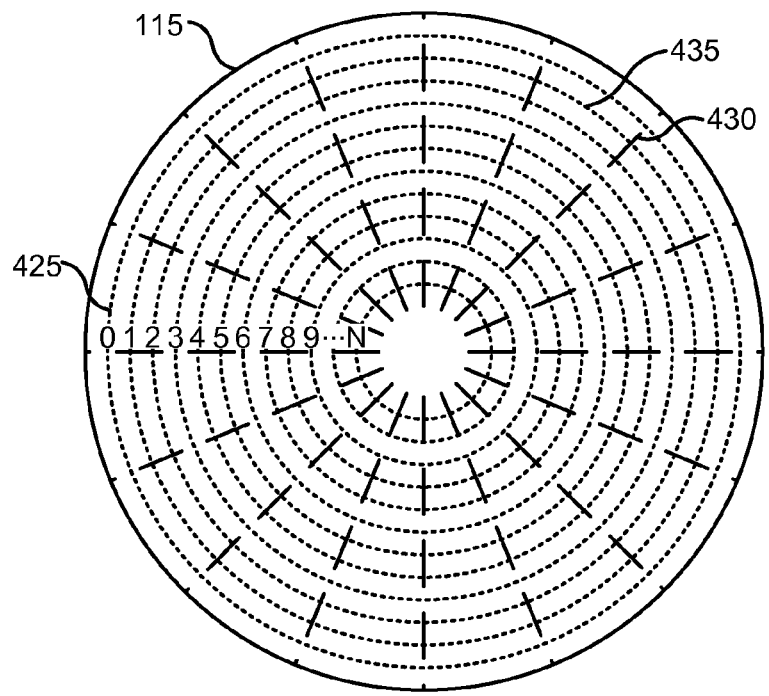

FIG. 4 is a schematic block diagram illustrating one embodiment of unwritten data 400 of the present invention. FIG. 4 includes the storage controller memory 235 and the hard disk 115 of FIGS. 2 and 1 respectively. The storage controller memory 235 may be a non-volatile memory such as SRAM. The description of the unwritten data 400 refers to the elements of FIGS. 1-3, like numbers referring to the like elements.

The hard disk 115, in the shown embodiment includes a plurality of read-write tracks 425 numbered from zero (0) to N. Further, a plurality of sector markers 430 divides the hard disk 115 into a plurality of sectors. For example, in the shown embodiment, sixteen (16) sector markers 430 divide the hard disk 115 into sixteen (16) sectors. A block between two (2) sector markers 430 on one (1) read-write track 425 constitutes a data block 435. For simplicity, the read-write tracks 425, sector markers 430, and data blocks 435 are not shown to scale.

In the shown embodiment of FIG. 4, the storage controller memory 235 stores 305 unwritten data sets 415 and a representative data set 405. The unwritten data sets 415 include a first data set 410*a*, a second data set 410*b*, and a third data set 410*c*. Although, for simplicity the storage controller memory 235 is shown to store only one (1) representative data set 405 and three (3) data sets 410*a*-410*c*, the storage controller memory 235 of the hard disk drive 100 may store any number of data sets.

Figure 5:
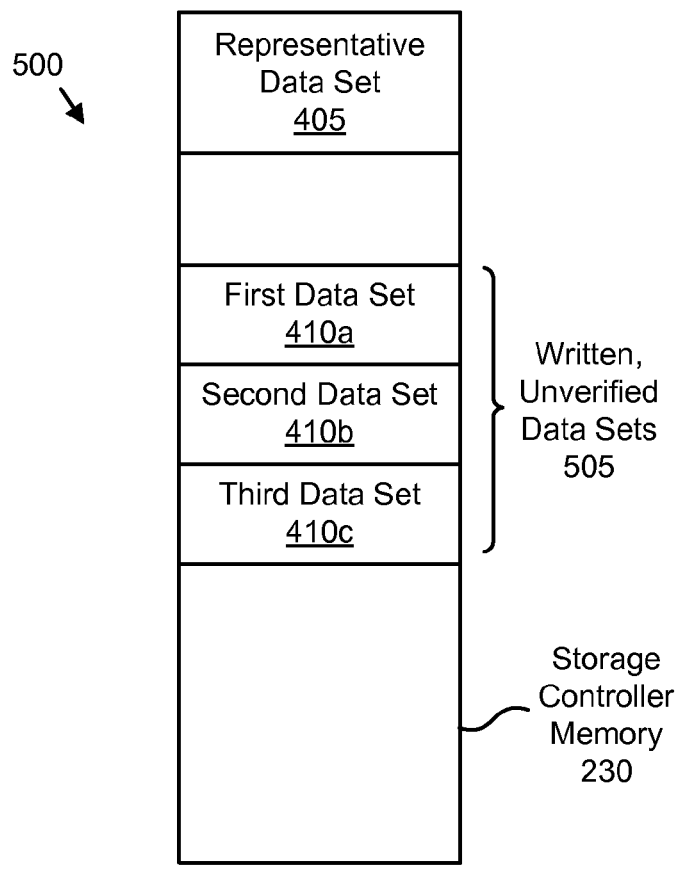
FIG. 5 is a schematic block diagram illustrating one embodiment of written data of the present invention.
Figure 5:
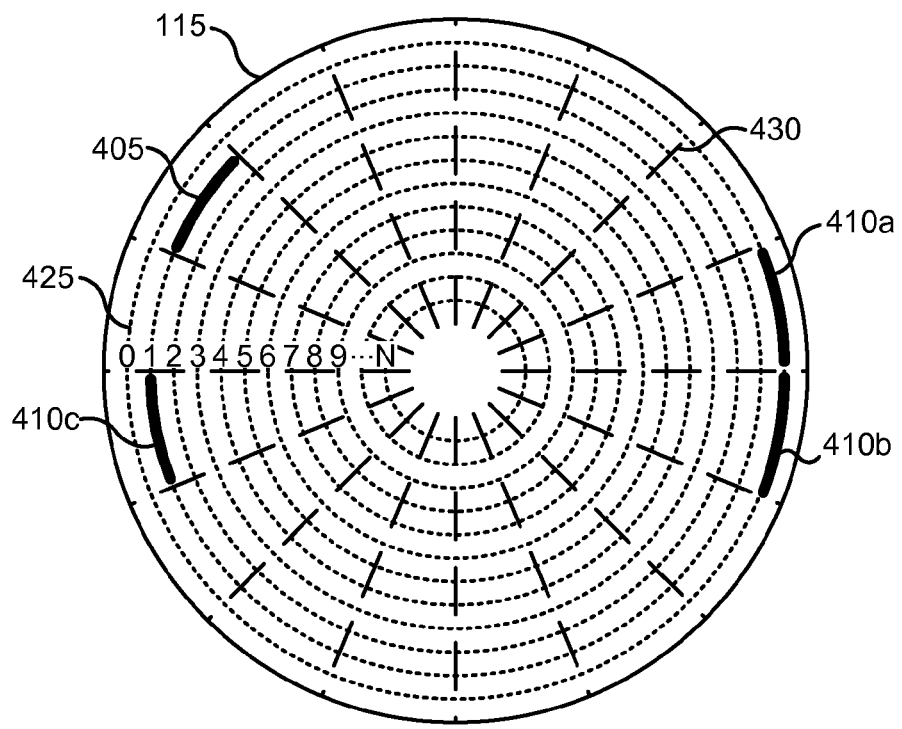

FIG. 5 is a schematic block diagram illustrating one embodiment of written unverified data 500 of the present invention. FIG. 5 includes the storage controller memory 235 and the hard disk 115 of FIG. 4. The description of the written unverified data 500 refers to the elements of FIGS. 1-4, like numbers referring to the like elements.

In the shown embodiment of FIG. 5, the storage controller memory 235 stores 305 written unverified data sets 505 and a representative data set 405. The written unverified data set 505 includes three (3) data sets 410*a*-410*c* of FIG. 4.

In the depicted embodiment, the representative data set 405 and the data sets 410*a*-410*c* are shown written 310 by the write module 210 to the hard disk 115 as shown with dark lines along the read-write track 425 of the hard disk 115 in their respective data blocks 425. Although, for simplicity the hard disk 115 shown written with only one (1) representative data set 405 and three (3) data sets 410*a*-410*c*, any number of data sets may be written to the hard disk 115. The data sets 410*a*-410*c* are written unverified data sets 505.

Figure 6:
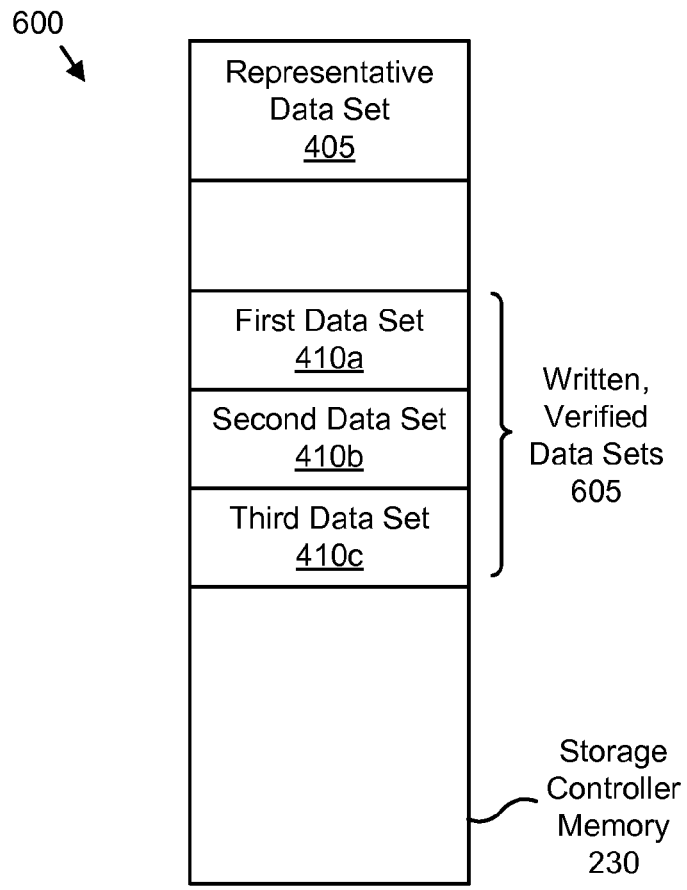
FIG. 6 is a schematic block diagram illustrating one embodiment of written verified data of the present invention.
Figure 6:
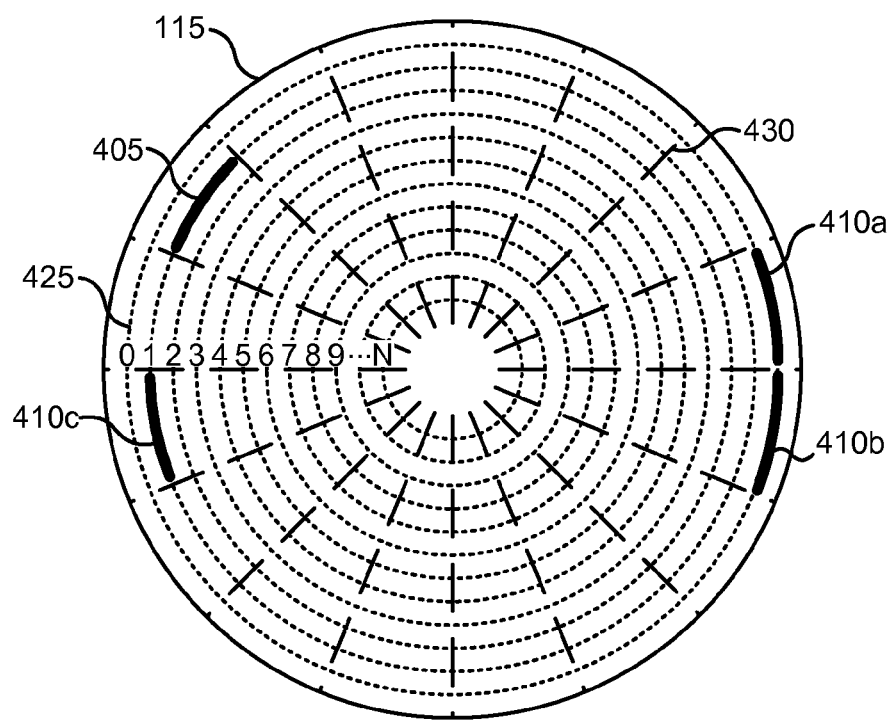

FIG. 6 is a schematic block diagram illustrating one embodiment of written verified data 600 of the present invention. FIG. 6 includes the storage controller memory 235 and hard disk 115 of FIGS. 4 and 5. The description of the diagram 600 refers to the elements of FIG. 1-5, like numbers referring to the like elements.

The verification module 215 verifies 315 that the representative data set 405 is correctly written to the hard disk 115. Because the representative data set 405 is verified, the present invention treats the write channel as verified and assumes that the data sets 410*a*-410*c* are verified, eliminating the need to check each data set 410*a*-410*c*. The storage controller memory 235 stores written verified data sets 605 and the representative data set 405. The stored, written, verified data sets 605 may be deleted 330. The data content or the target location of the representative data set 405 may be changed in preparation for the next invocation of the method 300.

The present invention provides an apparatus, a system, and a method for efficiently verifying writes. Beneficially, such an apparatus, a system, and a method efficiently verifies that writes are correctly written or not. Additionally, such an apparatus, a system, and a method would correctly write data and significantly decrease the time required for verifying writes. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to efficiently verify writes, the apparatus comprising:
    a storage device storing executable code;
    a processor storing the executable code, the executable code comprising
        a storage module storing a plurality of data sets in a storage controller memory in a write operation;
        a write module writing the plurality of data sets through a first write channel to a hard disk drive, writing each data set without verification except a representative data set of the plurality of data sets that is last written to the hard disk drive;
        the write module writing only the representative data set using a write-with-verify write that reads the representative data set from the hard disk drive after writing and verifies the representative data set if the read representative data set is equivalent to a copy of the representative data set stored in the storage controller memory;
        a verification module verifying that the plurality of data sets is successfully written to the first write channel if the representative data set is verified using the write-with-verify write; and
        a mitigation module rewriting the plurality of data sets through a second write channel in response to an unsuccessful write of the representative data set through the first write channel.

2. The apparatus of claim 1, wherein the representative data set is a specified value.

3. The apparatus of claim 1, the executable code further comprising a selection module randomly selecting first data blocks of the hard disk drive wherein the first data blocks store data that can be regenerated, storing original data of the first data blocks to the storage controller memory, restoring the original data to the selected first data blocks, and selecting second data blocks to receive second representative data in place of the first data blocks after a specified number of writes to the first data blocks.

4. A non-transitory computer useable medium storing a computer readable program, wherein the computer readable program when executed on a computer causes the computer to:
  store a plurality of data sets in a storage controller memory in a write operation;
  write the plurality of data sets through a first write channel to a hard disk drive, writing each data set without verification except a representative data set of the plurality of data sets that is last written to the hard disk drive;
  write only the representative data set using a write-with-verify write that reads the representative data set from the hard disk drive after writing and verifies the representative data set if the read representative data set is equivalent to a copy of the representative data set stored in the storage controller memory;
  verify that the plurality of data sets is successfully written if the representative data set is verified using the write-with-verify write; and
  rewrite the plurality of data sets through a second write channel in response to an unsuccessful write of the representative data set through the first write channel.

5. The non-transitory computer useable medium of claim 4, wherein the representative data set is a specified value.

6. The non-transitory computer useable medium of claim 4, the computer readable code further causing the computer to randomly select first data blocks of the hard disk drive wherein the first data blocks store data that can be regenerated, store original data of the first data blocks to the storage controller memory, restore the original data to the first selected data blocks, and select second data blocks to receive second representative data in place of the first data blocks after a specified number of writes to the first data blocks.

7. The non-transitory computer useable medium of claim 6, the computer readable code further causing the computer to verify a plurality of representative data sets for a plurality of groups of data sets prior to restoring the original data to the selected data blocks.

8. The non-transitory computer useable medium of claim 4, the computer readable code further causing the computer to randomly select unused data blocks of the write channel, write the representative data set to the selected data blocks, and verify the representative data is successfully written to selected data blocks.

9. The non-transitory computer useable medium of claim 4, wherein the storage controller memory is a non-volatile memory.

10. The non-transitory computer useable medium of claim 4, the computer readable code further causing the computer to verify a plurality of write channels by verifying a representative data set for each write channel, wherein each representative data set is unique.

11. A system to efficiently verify writes, the system comprising:
  at least one hard disk drive comprising a plurality of write channels;
  a storage controller accessing the at least one hard disk drive and comprising
    a storage controller memory;
    a storage device storing executable code;
    a processor executing the executable code, the executable code comprising
      a storage module storing a plurality of data sets in the storage controller memory in a write operation;
      a write module writing the plurality of data sets through a first write channel to at least one hard disk drive, writing each data set without verification except a representative data set of the plurality of data sets that is last written to the hard disk drive;
      the write module writing only the representative data set using a write-with-verify write that reads the representative data set from the at least one hard disk drive after writing and verifies the representative data set if the read representative data set is equivalent to a copy of the representative data set stored in the storage controller memory;
      a verification module verifying that the plurality of data sets is successfully written to the first write channel if the representative data set is verified using the write-with-verify write; and
      a mitigation module rewriting the plurality of data sets through a second write channel in response to an unsuccessful write of the representative data set through the first write channel.

12. The system of claim 11, wherein the representative data set is a specified value.

13. The system of claim 11, the executable code further comprising a selection module randomly selecting first data blocks of the hard disk drive wherein the first data blocks store data that can be regenerated, storing original data of the first data blocks to the storage controller memory, restoring the original data to the selected first data blocks, selecting second data blocks to receive second representative data in place of the first data blocks after a specified number of writes to the first data blocks.

14. A method for deploying computer infrastructure, comprising integrating a storage device storing computer-readable code into a computing system, wherein the code executed on the computing system performs the following:
  storing a plurality of data sets in a storage controller memory in a write operation;
  writing the plurality of data sets through a first write channel to a hard disk drive, writing each data set without verification except a representative data set of the plurality of data sets that is last written to the hard disk drive;
  and writing only the representative data set using a write-with-verify write that reads the representative data set from the hard disk drive after writing and verifies the representative data set if the read representative data set is equivalent to a copy of the representative data set stored in the storage controller memory;
  verifying that the plurality of data sets is successfully written to the first write channel if the representative data set is verified using the write-with-verify write; and
  rewriting the plurality of data sets through a second write channel in response to an unsuccessful write of the representative data set through the first write channel.

15. The method of claim 14, the method further comprising:
  randomly selecting first data blocks of the hard disk drive wherein the first data blocks store data that can be regenerated;
  storing original data of the first data blocks to the storage controller memory;
  restoring the original data to the selected data blocks; and
  selecting second data blocks to receive second representative data in place of the first data blocks after a specified number of writes to the first data blocks.

* * * * *